United States Patent
Sella et al.

(10) Patent No.: US 11,916,226 B2
(45) Date of Patent: Feb. 27, 2024

(54) ANODE COATING IN LITHIUM ION BATTERIES

(71) Applicant: STOREDOT LTD., Herzeliya (IL)

(72) Inventors: Eran Sella, Tel Aviv (IL); Nitzam Shadmi, Tel Aviv (IL); Ohad Goldbart, Yehud Monosson (IL); Daniel Aronov, Netanya (IL)

(73) Assignee: STOREDOT LTD., Herzeliya (IL)

( * ) Notice: Subject to any disclaimer, the term of this patent is extended or adjusted under 35 U.S.C. 154(b) by 324 days.

(21) Appl. No.: 16/946,787

(22) Filed: Jul. 6, 2020

(65) Prior Publication Data
US 2021/0013494 A1 Jan. 14, 2021

Related U.S. Application Data

(60) Provisional application No. 62/871,211, filed on Jul. 8, 2019.

(51) Int. Cl.
| | |
|---|---|
| *H01M 4/36* | (2006.01) |
| *H01M 4/02* | (2006.01) |
| *H01M 4/04* | (2006.01) |
| *H01M 4/133* | (2010.01) |
| *H01M 4/1393* | (2010.01) |
| *H01M 4/587* | (2010.01) |
| *H01M 4/62* | (2006.01) |
| *H01M 10/0525* | (2010.01) |
| *H01M 10/0565* | (2010.01) |

(52) U.S. Cl.
CPC ......... *H01M 4/366* (2013.01); *H01M 4/0402* (2013.01); *H01M 4/133* (2013.01); *H01M 4/1393* (2013.01); *H01M 4/587* (2013.01); *H01M 4/62* (2013.01); *H01M 10/0525* (2013.01); *H01M 10/0565* (2013.01); *H01M 2004/027* (2013.01); *H01M 2300/0082* (2013.01)

(58) Field of Classification Search
None
See application file for complete search history.

(56) References Cited

U.S. PATENT DOCUMENTS

| | | | | |
|---|---|---|---|---|
| 2004/0106040 A1* | 6/2004 | Fukuoka | ............... | H01M 4/13 |
| | | | | 429/232 |
| 2004/0214085 A1* | 10/2004 | Sheem | ............... | H01M 4/386 |
| | | | | 429/231.95 |
| 2005/0084760 A1* | 4/2005 | Hwang | ............... | H01M 4/587 |
| | | | | 429/231.95 |
| 2006/0093897 A1* | 5/2006 | Choi | ............... | H01M 50/543 |
| | | | | 429/161 |
| 2010/0028785 A1* | 2/2010 | Choi | ............... | H01M 10/4235 |
| | | | | 429/188 |
| 2010/0047318 A1* | 2/2010 | Kumar | ............... | A61K 9/5031 |
| | | | | 424/426 |
| 2012/0257325 A1* | 10/2012 | Zednickova | ............... | H01G 9/15 |
| | | | | 361/306.1 |
| 2012/0328949 A1* | 12/2012 | Yamaguchi | ............... | H01M 50/417 |
| | | | | 429/224 |
| 2016/0099485 A1* | 4/2016 | Onoda | ............... | H01M 4/366 |
| | | | | 429/57 |
| 2017/0110701 A1* | 4/2017 | Shi | ............... | H01M 50/411 |

FOREIGN PATENT DOCUMENTS

| | | | |
|---|---|---|---|
| JP | 2009-176703 | * | 8/2009 |
| WO | WO 2004/001880 | * | 12/2004 |
| WO | WO 2019/070810 | * | 4/2019 |

OTHER PUBLICATIONS

Machine translation of WO 2004/001880, published on Dec. 31, 2004 (Year: 2004).*
Polyvynlpyrrolidone, available at https://en.wikipedia.org/wiki/Polyvinylpyrrolidone, date unknown.*
Torlon PAI (Polyamideimide), available online at https://performanceplastics.com/materials/torlon/, date unknown.*
Machine translation of JP 2009-176703, published on Aug. 6, 2009 (Year: 2009).*

* cited by examiner

*Primary Examiner* — Anca Eoff
(74) *Attorney, Agent, or Firm* — Reches Patents

(57) ABSTRACT

Anodes for lithium-ion batteries and methods for their production are provided. Anodes comprise an initial anode made of consolidated anode material particles, and a coating of the initial anode, that comprises a layer of an ionic-conductive polymer which provides an artificial SEI (solid-electrolyte interphase) to facilitate lithium ion transfer through the coating while preventing direct fluid communication with the anode material particles and electrolyte contact thereto. The coating may be configured to keep the anode resistance low while preventing electrolyte decomposition thereupon, enhancing cell stability and cycling lifetime.

15 Claims, 2 Drawing Sheets ns of the

ANODE COATING IN LITHIUM ION BATTERIES

CROSS REFERENCE

This application claims priority from U.S. provisional patent 62/871,211 filing date Jul. 8, 2019 which is incorporated herein by reference.

BACKGROUND OF THE INVENTION

1. Technical Field

The present invention relates to the field of energy storage, and more particularly, to anode coatings in lithium ion batteries.

2. Discussion of Related Art

Continuous effort is made to develop lithium ion batteries with larger capacity, enhanced safety and higher charging rates. One of the main challenges is to control the formation of, and prevent the degradation of, the interface between the anodes and the electrolyte, particularly in fast charging lithium ion batteries.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an anode comprising an initial anode that comprises anode material particles and a coating of the initial anode, the coating comprising a layer of an ionic-conductive polymer that provides an artificial SEI (solid-electrolyte interphase) to facilitate lithium ion transfer therethrough while preventing fluid communication with the anode material particles.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
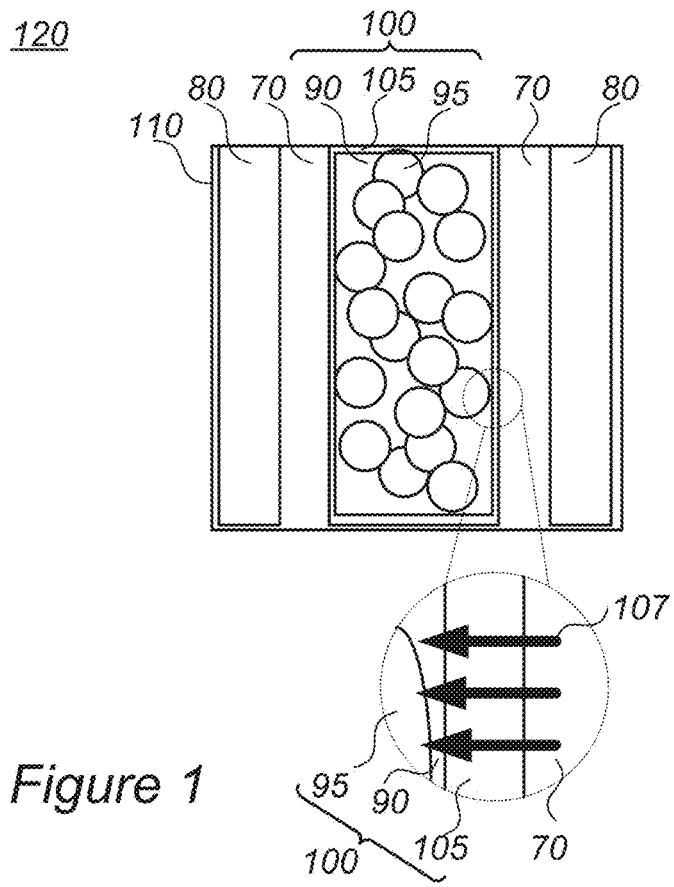
FIG. 1 is a high-level schematic illustration of a battery with a coated anode, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanism for producing and using anodes in lithium ion batteries, and thereby provide improvements to the technological field of energy storage. Anodes for lithium-ion batteries and methods for their production are provided. Anodes comprise an initial anode made of consolidated anode material particles, and a coating on the initial anode, that comprises a layer of an ionic-conductive polymer which provides an artificial SEI (solid-electrolyte interphase) to facilitate lithium ion transfer through the coating while preventing direct fluid communication with the anode material particles and direct contact of the electrolyte with the anode material particles. The coating may be configured to keep the anode resistance low while preventing electrolyte decomposition thereupon, supporting fast charging, e.g., at maximal rates for at least 5 C, 10 C, 20 C or more, and enhancing cell stability and cycling lifetime.

FIG. 1 is a high-level schematic illustration of a battery 120 with a coated anode 100, according to some embodiments of the invention. Battery 120, e.g., a lithium ion battery, comprises one or more anodes 100 and one or more cathodes 80, enclosed with electrolyte 70 and optionally separator(s) (not shown) within an enclosure 110, such as a pouch cover. Anodes 100 comprise anode material particles 95 (illustrated not to scale) that are attached, e.g., with binder material and additives to form initial anode 90, which is then coated with coating 105 to form coated anode 100. Coating 105 maybe selected and/or configured to provide an artificial SEI (solid-electrolyte interphase) that facilitates lithium ion transfer 107 therethrough (illustrated schematically) while preventing direct contact and direct fluid communication of electrolyte 70 with anode material particles 95, to avoid electrolyte decomposition and parasitic reactions that may degrade the battery.

In certain embodiments, disclosed cells may have lower resistance than cells using solid electrolytes. For example, coating 105 may be configured to have ionic conductivity above e.g., 4·10⁻⁷ S/cm, be from few nm to hundreds of microns thick (e.g., 3-10 nm, 10-30 nm, 30-100 nm, 0.1-1µ, 1-10µ, 10-100µ, several 100µ or combinations thereof) and may be made of ionic-conductive polymers such as any of PAA (Poly(acrylic acid)), PAA with citric acid, Poly-VC (poly(vinylene carbonate)), PVP (Polyvinylpyrrolidone), PVB (Polyvinyl butyral), thermoset polyimides such as polyamide-imides, e.g., Trolon®, hydroxypropyl cellulose, polyvinyl acetate-polyvinylpyrrolidone such as Kollidon® SR, and/or other polymers that dissolve in organic liquids such as ethanol, butanol, NMP (N-Methyl-2-pyrrolidone) etc. and are lithium permissible with sufficient ionic conductivity for lithium ions.

In certain embodiments, the ionic-conductive polymer may be polymerized in situ, namely after forming the anode(s), from respective monomer and/or oligomer material. For example, initial anode 90 may be soaked or immersed in a medium (e.g., solvent, gel, etc.) with the respective monomer and/or oligomer material (e.g., AA, VC, etc.) and possibly also having an initiator and/or catalyst, and then the wetted electrode may be dried and/or cured to yield coating 105 on coated anode 100. In various embodiments, the initiator may be activated or cured by any form of radiation or heat, chemically, etc. It is noted that applying monomer and/or oligomer material to initial anode 90 prior to the polymerization may provide better coverage of the structure of initial anode 90, and provide coating of inner spaces in initial anode 90 such as between active material particles, in addition to coating the external surface of anode 100. For example, poly VC coating 105 may be formed by wetting initial anode 90 with a solvent including VC components and respective initiators, and curing the wetted electrode to polymerize and form poly VC coating 105. Any of the disclosed ionic-conductive polymers may be polymerized at least partly in situ. Advantageously, in situ polymerization may provide better coating efficiency and coverage (e.g., a larger coated area, a thinner coating) and better polymerization control, that may result in a more stable coating layer 105.

In various embodiments, anode material particles 95 may comprise any of metalloids, Si, Ge, Sn, their combinations and alloys and/or graphite active material, as well modified and/or coated anode material particles 95, e.g., as disclosed in U.S. Patent Publication No. 2017/0294687, incorporated herein by reference in its entirety.

Figure 2:
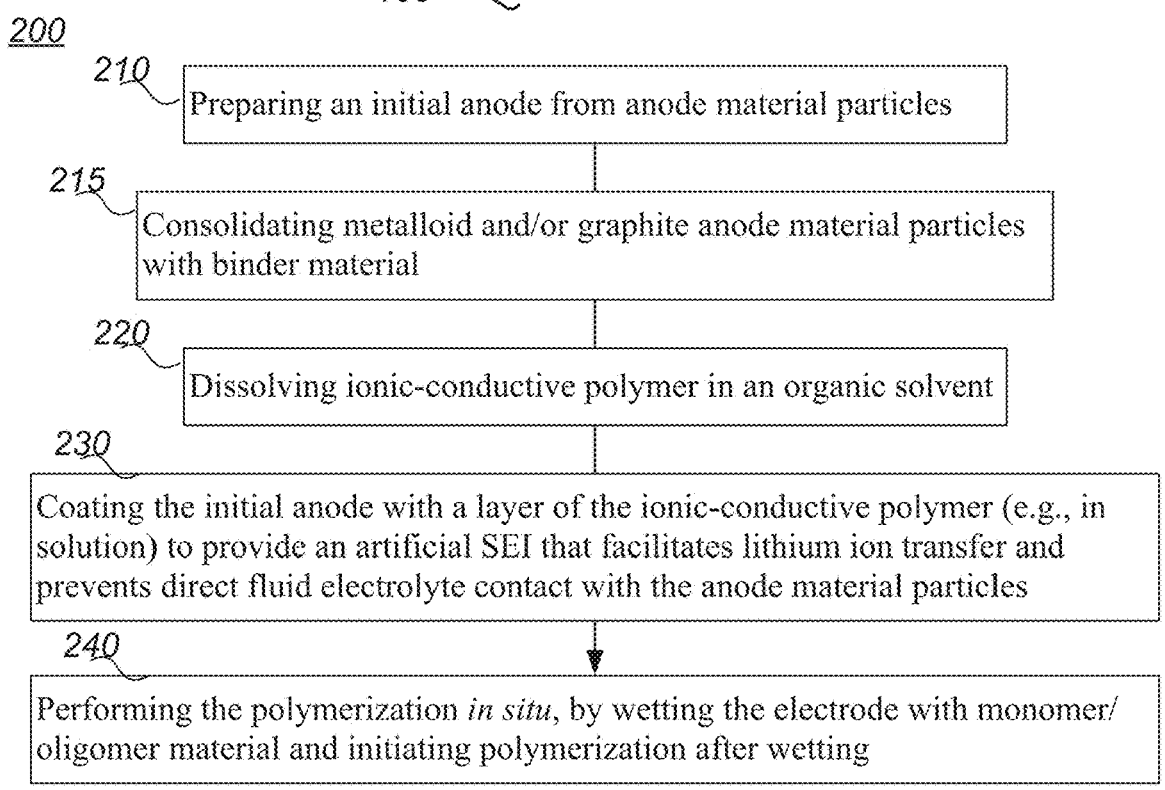
FIG. 2 is a high-level flowchart illustrating a method, according to some embodiments of the invention.

FIG. 2 is a high-level flowchart illustrating a method 200, according to some embodiments of the invention. The method stages may be carried out with respect to anode 100 described above, which may optionally be configured by implementing method 200. Method 200 may comprise the following stages, irrespective of their order.

Method 200 may comprise preparing an initial anode from anode material particles (stage 210), e.g., by consolidating the anode material particles with binder material (stage 215); and coating the initial anode with a layer of an ionic-conductive polymer that provides an artificial SEI (solid-electrolyte interphase) to facilitate lithium ion transfer therethrough while preventing direct fluid communication with the anode material particles (stage 230).

For example, the anode material particles comprise at least one of Si, Ge, Sn, their combinations and alloys, and/or graphite active material, possibly modified and/or coated, and the ionic-conductive polymer may comprise at least one of PAA (Poly(acrylic acid)), PAA with citric acid, Poly-VC (poly(vinylene carbonate)), PVP (Polyvinylpyrrolidone), PVB (Polyvinyl butyral), thermoset polyimides, hydroxy-propyl cellulose, polyvinyl acetate-polyvinylpyrrolidone, and/or Polyurea and/or polyurethane, and their combinations and co-polymers.

In certain embodiments, method 200 may comprise dissolving the ionic-conductive polymer in an organic solvent and using the solution to carry out the coating (stage 220), e.g., by any of the coating methods listed below.

In certain embodiments, method 200 may comprise performing the polymerization in situ, by wetting the electrode with monomer/oligomer material and initiating polymerization after wetting (stage 240). The polymerization may be carried out after forming the anode(s) are formed, by soaking or immersing an initially-formed anode in a medium (e.g., solvent, gel, etc.) with the respective monomer and/or oligomer material (e.g., AA, VC, etc.) and possibly polymerization initiator(s) and/or catalyst(s), and drying and/or curing the wetted anode(s) to form the polymer coating.

In various embodiments, coating 105 may be applied onto initial anode 90 by any of the following techniques: spray coating, impregnation, dip coating, spin coating, grit blasting, ultrasonic drenching and application of light curing (ultraviolet radiation, infra-red, visible light) and air and/or heat and/or ultrasonic and/or chemical treatment or possibly combinations of any of the applications and any of the curing methods.

Figure 3:
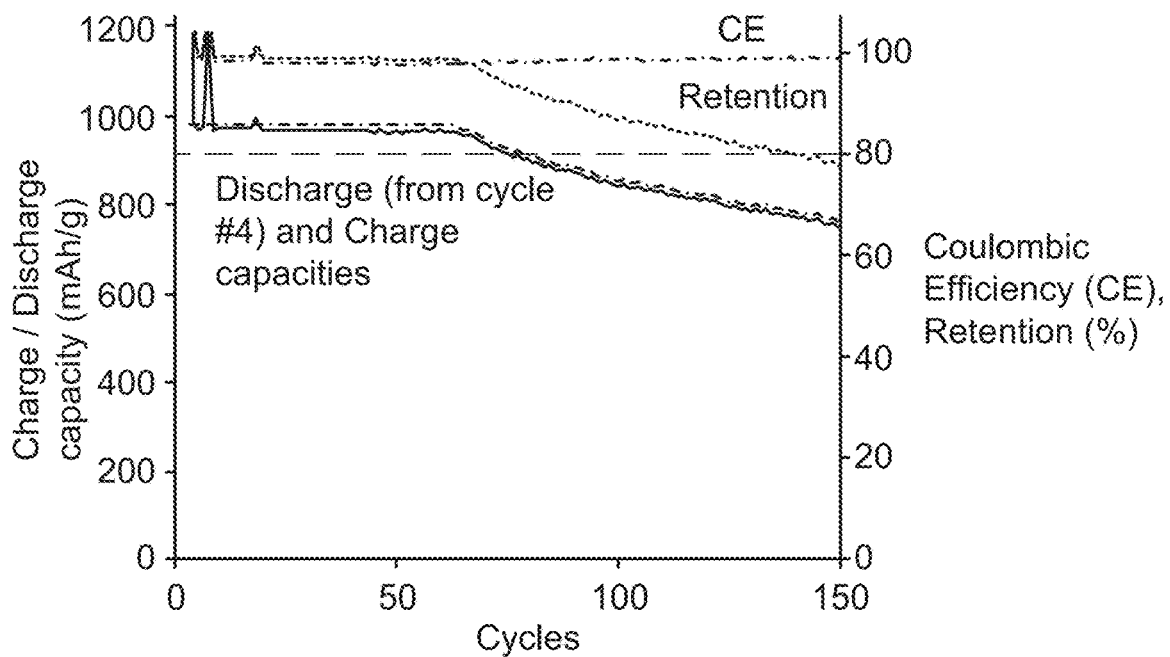
FIGS. 3 and 4 illustrate the efficiency of the coating by showing the performance of cells with PAA (Poly(acrylic acid))-coated Si—Sn anodes and a cross-section SEM (scanning electron microscopy) image of the anode, respectively, according to some embodiments of the invention.
Figure 4:
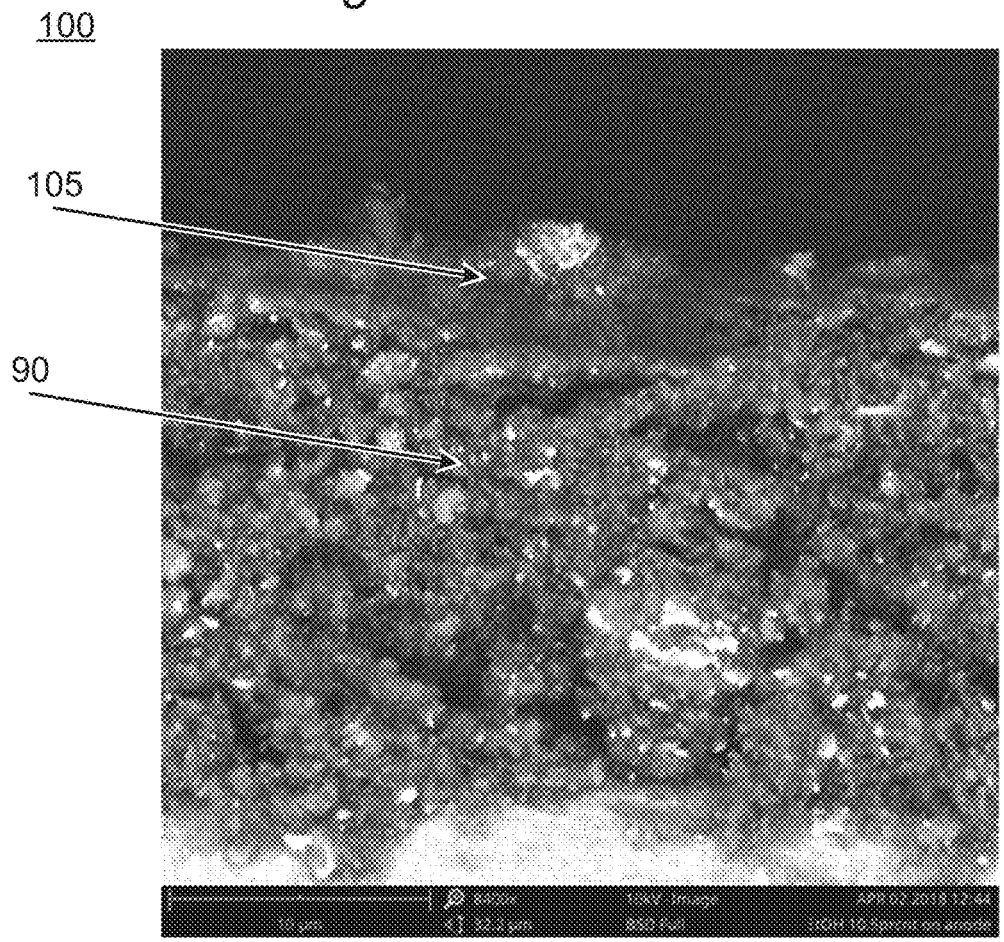

FIGS. 3 and 4 illustrate the efficiency of coating 105 by showing the performance of cells with PAA (Poly(acrylic acid))-coated Si—Sn anodes and a cross-section SEM (scanning electron microscopy) image of anode 100, respectively, according to some embodiments of the invention. Si—Sn anodes 90 were prepared with regular ball milling of Si particles having their natural oxide layers and with Sn. The PAA coating was carried out by Dr. Blade coating of 10.5% PAA-450k in ethanol on an anode film. The binder for the anode was LiPAA which has negligible solubility in ethanol. FIG. 3 shows improved cycle life of ca. 145 cycles (compared to 90-110 cycles without coating 105. In certain embodiments, coating of anode 90 may stabilize the SEI, provide sufficient ionic and electric conductivity from the anode surface to active material particles 95 and increase cycling lifetime. FIG. 4 illustrated PAA coating 105 on initial anode 90 in cross section.

In various embodiments, coating 105 may be applied onto initial anode 90 by any of the following methods—using Dr. blade as in the example, any slot die equivalent method, spray coating, dip coating, spin coating, Langmuir-Blodgett film deposition, application of curing using UV (ultraviolet radiation), air and/or heat or possibly combinations of any of the application and curing methods.

In various embodiments, coating 105 may be attached to initial anode 90 and/or to anode material particles 95 by various mechanisms, that may range from physical bonding, through van der Waals forces or other weak bonding forces, through hydrogen bonding or polar bonding, to covalent chemical bonding or ionic bonding, as non-limiting examples. The bonding mechanism to anode binder material may be different from the bonding mechanism to anode material particles 95, similar thereto, or coating 105 may bind, at least primarily to only one of the binder material and anode material particles 95. In certain embodiments, anodes 100 may comprise pin holes that expose small parts of the copper current collector, and coating 105 may be attached and/or secured to the current collector through the pin holes.

In various embodiments, the extent of coverage of coating 105 may be above 80%, above 90%, above 95% or above 99% of the surface area of initial anode 90. In certain embodiments, coating 105 may cover all the surface area of initial anode 90.

In certain embodiments, coating 105 may be complemented by coatings of anode material particles 95, as described, e.g., in U.S. Patent Publication No. 2017/0294687. Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a soft or/and hard package (e.g., pouches, prismatic or cylindrical packages, etc. Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. In certain embodiments, polymerization of coating 105 and/or of coatings of the anode material particles may be controlled, as disclosed, e.g., in any of U.S. patent application Ser. No. 16/291,031, 62/711,639 and 62/804,778, incorporated herein by reference in their entirety. For example, anodes may be based on carbon (e.g., graphite, graphene or other carbon-based materials), metalloid anode material such as Si, Ge, Sn and their combinations and/or metals such as Li-metal. Cathodes may comprise lithium metal oxide (LiMeO), wherein Me can be one or several metals selected from Ni, Co, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates, such as ethylene carbonate, diethyl carbonate, propylene carbonate, VC (vinylene carbonate), FEC (fluoroethylene carbonate), EA (ethyl acetate), EMC (ethyl methyl carbonate), DMC (dimethyl carbonate) and combinations thereof. In various embodiments, the electrolytes may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, LiB $(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. patent application Ser. No. 16/243,190, incorporated herein by reference in its entirety.

Disclosed lithium ion batteries (and/or respective battery cells thereof) may at least partly be configured, e.g., by selection of materials, to enable operation at high charging and/or discharging rates (C-rate), ranging from 3-10 C-rate, 10-100 C-rate or even above 100 C, e.g., 5 C, 10 C, 15 C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. An anode comprising:
   an initial anode that comprises anode material particles, and
   a coating formed on only a part of the initial anode, the coating comprising a layer of an ionic-conductive polymer that provides an artificial SEI (solid-electrolyte interphase) to facilitate lithium ion transfer therethrough while preventing fluid communication of electrolyte with the anode material particles; wherein the ionic-conductive polymer comprises thermoset polyimides; wherein the initial anode comprises pin holes and a part of the coating passes through the pin holes.

2. The anode of claim 1, wherein the anode material particles comprise at least one of Si, Ge, Sn, their combinations and alloys.

3. The anode of claim 1, wherein the anode material particles comprise graphite active material.

4. The anode of claim 1, wherein the ionic-conductive polymer further comprises at least one of PVP (Polyvinylpyrrolidone), PVB (Polyvinyl butyral), polyvinyl acetate-polyvinylpyrrolidone, and/or Polyurea.

5. The anode of claim 1, wherein the ionic-conductive polymer is polymerized in situ, from dried and/or cured monomer and/or oligomer material applied onto the initial anode.

6. A method comprising:
preparing an initial anode from anode material particles, and
coating only a part of the initial anode with a coating layer of an ionic-conductive polymer that provides an artificial SEI (solid-electrolyte interphase) to facilitate lithium ion transfer therethrough while preventing fluid communication with the anode material particles and prevents direct fluid electrolyte contact with the anode material particles; wherein the ionic-conductive polymer comprises thermoset polyimides;
wherein the coating of the only part of the initial anode comprises polymerizing the coating layer at least partially in situ, by applying monomer/oligomer material to the initial anode and initiating polymerization after the application of the monomer/oligomer material; wherein the polymerizing the coating layer at least partially in situ comprises only partially polymerizing the coating layer in situ.

7. The method of claim 6, wherein the preparation of the initial anode comprises consolidating the anode material particles with binder material, wherein the anode material particles comprise at least one of Si, Ge, Sn, their combinations and alloys, and/or graphite active material.

8. The method of claim 6, wherein the ionic-conductive polymer further comprises at least one of PAA (Poly(acrylic acid)), PAA with citric acid, PVP (Polyvinylpyrrolidone), PVB (Polyvinyl butyral), hydroxypropyl cellulose, polyvinyl acetate-polyvinylpyrrolidone, and their combinations and co-polymers.

9. A method comprising:
preparing an initial anode from anode material particles, and
coating only a part of the initial anode with a coating layer of an ionic-conductive polymer that provides an artificial SEI (solid-electrolyte interphase) to facilitate lithium ion transfer therethrough while preventing fluid communication with the anode material particles and prevents direct fluid electrolyte contact with the anode material particles; wherein the ionic-conductive polymer comprises thermoset polyimides;
wherein the coating of the only part of the initial anode comprises polymerizing the coating layer at least partially in situ, by applying monomer/oligomer material to the initial anode and initiating polymerization after the application of the monomer/oligomer material; wherein the polymerizing the coating layer in situ, comprise soaking the initial anode in a gel, the gel comprising the respective monomer/oligomer material, and an activated initiator.

10. A lithium ion cell comprising at least one anode and at least one cathode, enclosed with electrolyte and optionally at least one separator within a pouch cover, wherein each anode of the at least one anode comprises an initial anode that comprises anode material particles, and a coating on only a part of the initial anode, the coating comprising a layer of an ionic-conductive polymer that comprises thermoset polyimides that provides an artificial SEI (solid-electrolyte interphase) to facilitate lithium ion transfer therethrough while preventing fluid communication of electrolyte with the anode material particles; wherein for each anode of the at least one anode, the initial anode of the anode comprises pin holes, wherein a part of the coating passes through the pin holes and contacts a current collector of the anode.

11. The lithium ion cell according to claim 10, wherein for each anode, the anode material particles comprise at least one of Si, Ge, Sn, their combinations and alloys.

12. The lithium ion cell according to claim 10, wherein for each anode, the anode material particles comprise graphite active material.

13. The lithium ion cell according to claim 10, wherein for each anode, the ionic-conductive polymer further comprises at least one of PAA (Poly(acrylic acid)), PAA with citric acid, Poly-VC (poly(vinylene carbonate)), PVP (Polyvinylpyrrolidone), PVB (Polyvinyl butyral), hydroxypropyl cellulose, polyvinyl acetate-polyvinylpyrrolidone, and/or Polyurea and/or polyurethane, and their combinations and co-polymers.

14. The lithium ion cell according to claim 10, wherein for each anode, the ionic-conductive polymer is soluble in an organic solvent.

15. The lithium ion cell according to claim 10, wherein for each anode, the ionic-conductive polymer is polymerized in situ, from dried and/or cured monomer and/or oligomer mate.

* * * * *